March 6, 1962

J. W. BEATTY 3,023,703

CHAFF DISPENSING DEVICE

Filed Aug. 24, 1955

INVENTOR.
JOHN W. BEATTY
BY Charles H. Wagner and
Wade County
ATTORNEYS

March 6, 1962 J. W. BEATTY 3,023,703
CHAFF DISPENSING DEVICE
Filed Aug. 24, 1955 5 Sheets-Sheet 3

INVENTOR.
JOHN W. BEATTY
BY
ATTORNEYS

March 6, 1962  J. W. BEATTY  3,023,703
CHAFF DISPENSING DEVICE
Filed Aug. 24, 1955  5 Sheets-Sheet 5

INVENTOR.
JOHN W. BEATTY
BY Charles H. Wagner and
Wade Koontz
ATTORNEYS

United States Patent Office 3,023,703
Patented Mar. 6, 1962

3,023,703
CHAFF DISPENSING DEVICE
John William Beatty, Dayton, Ohio, assignor to the United States of America as represented by the Secretary of the Air Force
Filed Aug. 24, 1955, Ser. No. 530,432
13 Claims. (Cl. 102—89)
(Granted under Title 35, U.S. Code (1952), sec. 266)

The invention described herein may be manufactured and used by or for the United States Government for governmental purposes without payment to me of any royalty thereon.

This invention relates to chaff dispensing devices and more particularly to chaff dispensing rockets, having for an object a time integrated mechanical fuse head and chaff containing body for rockets in which the mechanical fuse head releases a chaff containing body composed of separable segments. The invention does not pertain particularly to the rocket or propulsion body, other than the fact that the subject invention is mounted on the front end thereof.

The invention, as illustrated, is incorporated on a standard 2.75 inch rocket motor, and is intended for use in forward launching of chaff for self-protection of an aircraft in flight from radar directed anti-aircraft or rocket fire and radar controlled guided missiles.

A further object is the provision of a tubular rocket head, comprising a plurality of segments or petals held interlocked in chaff confining relation at both ends and a mechanical time controlled fused device for causing release and outward displacement of the front ends of the sections to effect automatic release of the rear ends, following the release of the front ends in flight and outward movement thereof into the slip stream to release and dispense the "chaff" material stored within the head into the slip stream.

A still further object of the invention is the inclusion of a base having interlocking connecting means for the rear ends of the sections including means for securely mounting the base on the front end of a conventional rocket such as a 2.75 HV rocket in place of the conventional "war head."

A further object is the provision of a time controlled, inertia operated chaff dispenser carried on the front end of an aircraft carrying HV rocket for projection, with the rocket, out ahead of the aircraft, in which the time controlled fuse device is initiated into operation by the inertia and forward flight of the rocket and dispenser as it is fired and leaves the said aircraft, a still further object comprising forming the chaff retaining body from a plurality of longitudinal, concave-convex segments abutting along their edges to form an elongated tubular chaff storage receptacle in which the segments are releasably interconnected to the rocket at their rear ends and retained in chaff confining relation at their forward ends by the time controlled fuse device.

A further object is the provision of a chaff dispenser head for rockets in which the mechanical time delay fuse device will function only after the rocket and chaff dispenser has been subjected to a prolonged predetermined number of g's acceleration in a direction substantially longitudinal with respect to the intended flight direction of the rocket, and will not operate to release or start the timing mechanism if the rocket is dropped or subjected to an excessive instantaneous shock.

A further object is the provision of means whereby the chaff can be inserted into the separable chaff dispensing shell in a package while held in compressed condition and the shell or container then is closed to provide the confining means until the sections of the shell are released by the timing means following a prolonged forward acceleration in excess of a predetermined number of g's, when the segments or petals of the body are released at their front ends and swing outwardly to discharge the chaff in the slip stream of the rocket.

A further object is the provision of an inertia operated release means for the front ends of the segments of the chaff confining shell, in which the inertia operated means comprises means for energizing the timer release means for subsequent timed release action.

A further object is the provision of a chaff dispenser arranged for mounting longitudinally on the front end of a HV rocket, preferably for aircraft, in which the dispenser is substituted for the conventional rocket "war head," and includes an inertia operated settable timer for releasing the segments of the shell to discharge the chaff at a predetermined time interval after the rocket is fired.

A further object includes means for projecting the front ends of the segments or petals of the container outwardly after release to release the chaff therein into the slip stream ahead of the rocket motor.

A further object is the provision of a mechanical fuse that is capable of mass production and is simple, positive, and relatively inexpensive to manufacture, being entirely mechanical in nature, is therefore safe for handling at all times.

A further object is the provision of a projectile type of chaff dispenser that is convenient and easy to load and assemble for use.

Other objects and advantages of the invention will readily become apparent from the appended claims accompanying drawing, and following specification in which like reference numerals refer to like parts in the several figures of the drawing.

Drawings

FIGURE 6 shows the metalic shell partly broken away to show the chaff material therein.

FIGURE 8 is a side view of the mechanical fuse device detached from the nose section of the rocket and shown in "release" position.

FIGURE 9 is a side view of the device shown in FIGURE 8 taken however at right angles.

Figures 1, 2:
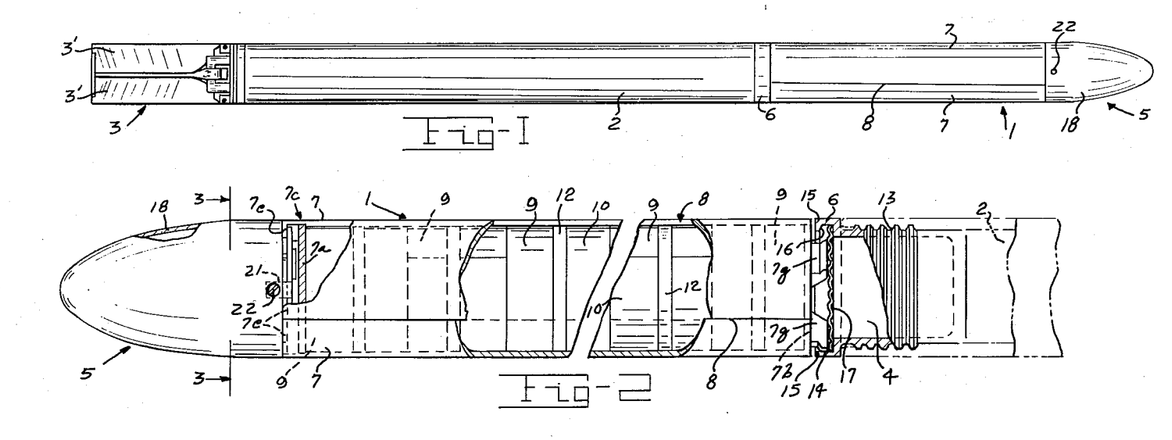
FIGURE 1 is a side elevation of a chaff dispensing rocket embodying my invention.
FIGURE 2 is an enlarged side view of a mechanical fuse chaff rocket incorporating the invention, parts being broken away and shown in sections, a portion of the rocket motor being shown in phantom.

Referring to FIGURE 1 the reference numeral 1 denotes generally the chaff dispensing body or shell while the supporting vehicle or rocket motor is indicated at 2 and has a tail or collapsible fin section 3, with the stabilizing fins 3', 3' shown in retracted position, the war head connecting and supporting socket or closure 4 being provided at the forward end of the rocket motor attached for mounting the chaff dispensing body 1 of the subject invention on the rocket motor 2.

The chaff dispension section 1 comprises generally a nose portion 5 containing a mechanical release fuse mechanism, a rear mounting cap or support 6, and a chaff dispensing body composed of a plurality of segments or complemental shells 7, releasably interlocked at their front and rear ends to the parts 5 and 6 to form a longitudinally split cylindrical chaff container, the separation points or longitudinal edges being indicated at 8.

Referring first to the chaff containing and dispensing body reference is made primarily to FIGURES 2, 11, 12 and 13, in which three complemental segments 7, are employed. They are identical, forming a thin longitudinal shell of cylindrical curvature having front and rear end plates of segmental form as indicated at 7ª and 7ᵇ which are welded or otherwise secured against the shoulders 7ᶜ, 7ᵈ formed on the inner surface of the shell.

The three complemental shell portions 7 and their attached end segments 7ª and 7ᵇ, together form the cylindrical chaff receptacle or dispensing body 1.

The shells 7 extend forwardly beyond the front plates 7ª as shown and are formed with inwardly projecting short flanges 7ᵉ at each of their opposite edges to provide locking flanges for engagement with the mechanical time fuse mechanism in the nose section 5, later to be set forth. Then each of the front segment plates 7ª also carry a radially extending actuating lug midway between their opposite edges as indicated at 7ᶠ, the purpose of which will later be described.

The rear plate segments 7ᵇ are each provided with a heavy latching lug 7ᵍ formed with an interlocking outwardly projecting flange having a spring abutment face 7ʰ and 7ⁱ respectively for latching and disengaging relation with rear end cap or supporting member 6 and later to be described in detail. The chaff cartridges indicated at 9 are shown in FIGURE 2 in position within the shell 7 each comprising a wide retaining band 10 of suitable width, and length to overlap, surrounding suitably packed and compressed "chaff," material 11, the band 10 being retained from expansion until loaded into the receptacle 7 by a narrower band 12. After the chaff cartridges are loaded in the rocket these narrower bands are severed by a suitable cutting tool which is inserted and operated longitudinally through one of the slots 8 between the adjacent edges of the petal-like segments 7 of the chaff container body 1.

The rocket motor 2 is formed with a threaded socket at its forward end. The supporting cap-shaped body or rear mounting cap 6 is externally threaded at 13 and screwed home tight in the socket 4 of the rocket motor and is formed with an annular channel 14 having an interned flange 15 and shoulder 16, a radially corrugated spring washer 17 being seated within the channel 14 on the shoulder 16. The outwardly extending flanges or latching lugs 7ᵍ are inserted with the forward ends of the segments 7 separated and as these forward ends are brought together the flanges 7ʰ engage the interned shoulder 16 and force the abutment faces 7ᵍ into compressing engagement with the corregated spring washer 17, placing the same under compression. The expansion of the compressed chaff in the cartridge tensions the forward ends of the segments 7 outwardly upon their release.

The forward ends of the segments 7 are releasably interlocked with the nose sections 5, more specifically with the inertia operated mechanical time fuse device in the nose section which will now be described.

Figure 3:
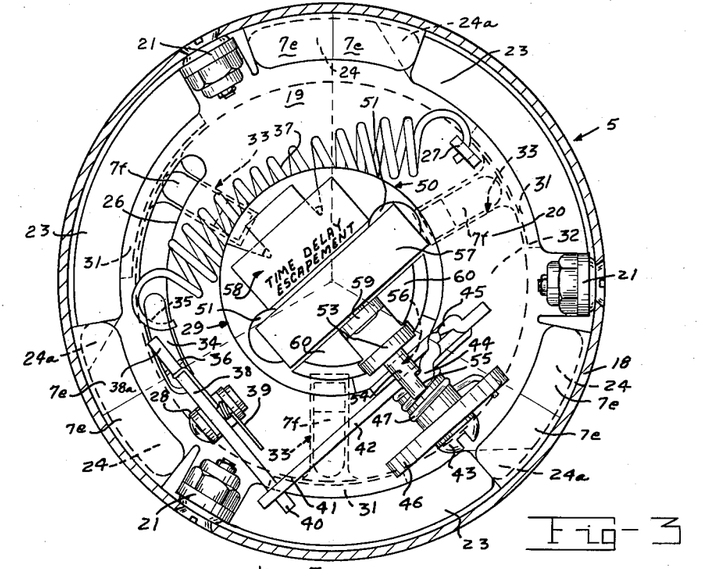
FIGURE 3 is a transverse sectional view through the nose section of the rocket taken approximately on the plane indicated by the line 3—3 in FIGURE 2, looking in the direction of the arrows, and showing the chaff confining segments of the body in normal locked-in relation, such as prior to firing of the rocket.
Figure 4:
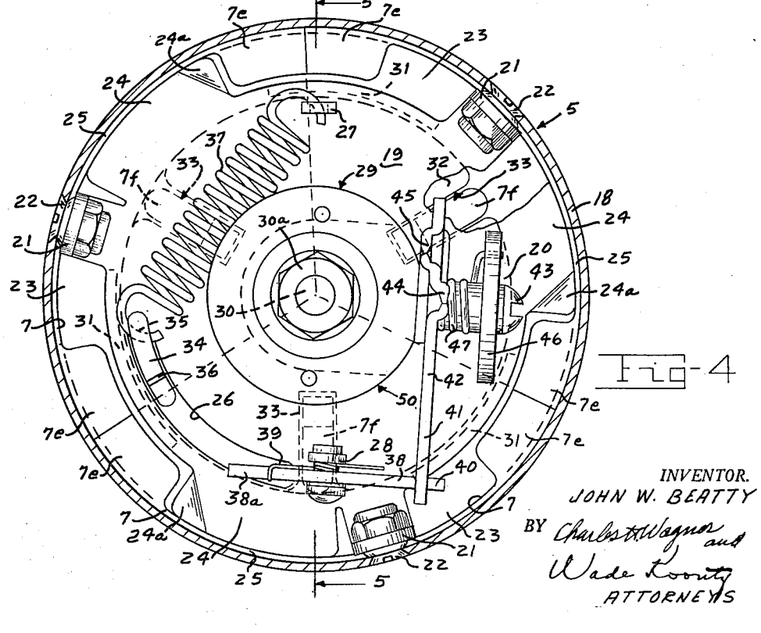
FIGURE 4 is a transverse sectional view through the nose section of the rocket, similar to FIGURE 3, but showing the mechanical fuse device in its unlocked condition such as after firing and the application of a predetermined prolonged number of g's. The interlocking forward ends of the segments or petals of the chaff confining body being shown in phantom.
Figure 5:
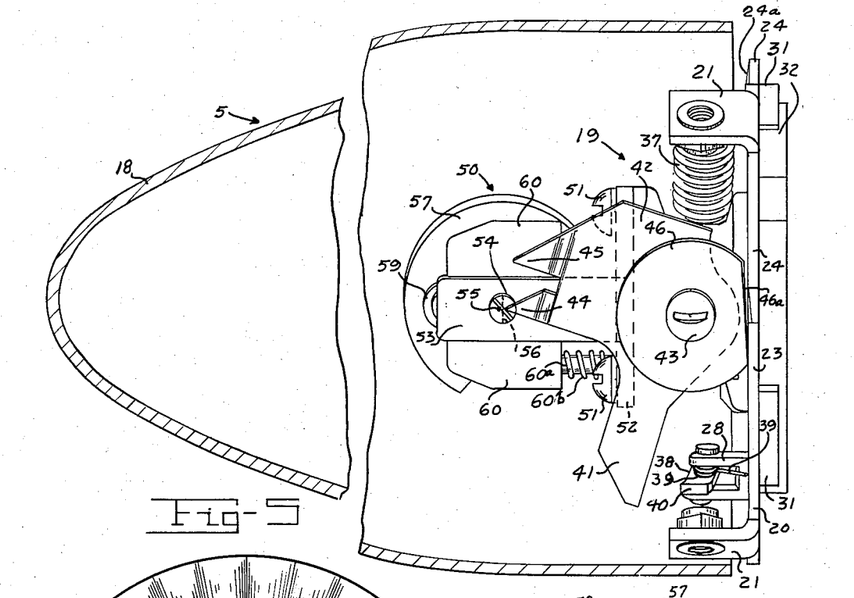
FIGURE 5 is a longitudinal sectional view through the nose and inertia operated fuse portion of the chaff dispenser, the chaff confining segments being omitted, however, the fuse device is shown in operative or "controlling" relation.
Figure 6:
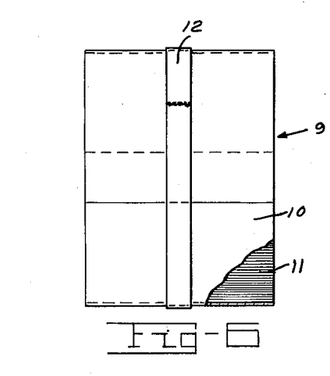
FIGURES 6 and 7 are side and end elevations of the chaff cartridge or containers used with the subject invention.
Figure 7:
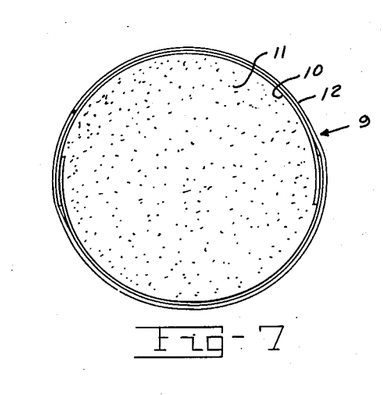

Referring to FIGURES 3, 4, 5, 8 and 9 the nose section 5 comprises a streamline shell 18 in which is mounted the inertia operated mechanical fuse device 19. The fuse device comprises a supporting or mounting plate 20 having mounting ears or tabs 21 receiving the screw fasteners 22 which pass through the shell 18 and are secured in the tabs 21. The mounting plate 20 is formed with three cutaway portions or notches 23 and three locking lugs 24 having their front edges beveled at 24ª, the peripheral edges of the lugs 24 being spaced rearwardly from the rear edge of the shell 18 as seen in FIGURE 5 to radially admit the web portions of the petal segments 7, and the front locking lugs 7ᵉ thereon. The mounting plate 20 is also formed with an arcuate slot 26, a spring seat anchor lug 27, a bifurcated locking dog pivot post 28, and a central hub portion 29 in which is mounted a locking plate journal shaft 30. The opposite face of the supporting plate 20 is provided with three circumferentially spaced short peripheral flanges 31.

A rotary actuating or locking plate 32 is fixed on the shaft 30 within the confines of the flanges 31 and is formed with three slits or radial inwardly extending notches 33 which are shaped to receive the radial lugs 7ᶠ on the front end segments 7ª of the chaff dispensing receptacle sections 7. The shaft 30 is journalled for supporting the plate 32 in free oscillatory relation to the mounting plate 20 as shown in FIGURE 4 and is secured by a nut 30ª. This plate 32 also carries on its front face an arcuate actuating and locking lug 34 which extends through the slot 26 and is formed with a spring seating notch 35, and a locking notch or shoulder 36. A main actuating spring 37 connects the lug 35 on the plate 32 with the lug 27 on the mounting plate 20, the spring 37 being under tension normally urges the locking plate, as shown in FIGURE 4, to rotate clockwise or to the unlocked position. Since the radial lugs 7ᶠ are normally interengaged in the radial slots 33 rotation of the plate 32 by the spring 37 from the position shown in FIGURE 3 (which is the locked position), to the unlocked position in FIGURE 4 rotates the front inwardly extending flanges 7ᵉ off of the locking lugs 24 as shown in FIGURE 3 (into the space portions 25), permitting disengagement of the nose section 5 and release of the front ends of the chaff containing segments 7 (FIGURE 2).

Locking of the disk or plate 32 in operative or retaining position, as shown in FIGURE 3, is accomplished by a centrally pivoted latch member 38 carried on the post 28 and formed with a catch dog or abutment 38ª engageable with the shoulder 36, a spring 39 urging or rocking the latch 38 to engaging position. The latch has a tail portion 40 disposed under a release lever arm 41 of a release lever or plate 42.

The release plate 42 is journalled on a pivot shaft 43 fixed in the hub member 29 perpendicular to the shaft 30. The plate 42 is sort of L shaped having a set of primary and secondary knife edge abutments 44 and 45 as shown in FIGURE 5.

The pivot shaft 43 carries a spring seat washer or disk 46, flattened at one edge at 46ª to engage the face of the supporting plate 20 and prevent rotation of the disk. A coil spring 47 has one end anchored in the disk 46 and surrounds the pivot shaft 43, clockwise, with its opposite end disposed under a shoulder on the release plate 42 and is tensioned to rock the plate 42 counterclockwise to depress the latch tail 40 and raise the catch 38 and release the plate 32, allowing the spring 37 to rotate the plate 32 to the release position shown in FIGURE 4, thus rotating the head or nose portion 5 relative to the chaff containing body 1 (FIGURE 2).

The circular flanges 31 on the plate 24 are disposed in front of the entrances to the notches 33 when the plate 32 is in locked or operative position and retain the lug 7$^f$ in these notches and prevent outward movement of the front ends of the chaff section. Rotation of the supporting plate 32 by spring 37 shifts the arcuate retaining flanges out of register with the notches 33 and permits the front ends of the chaff segments to move radially outward under the influence of the expansion of the chaff cartridges within the chaff container 7.

The inertia operated timing mechanism 50 used in the subject invention is fastened onto the front end of the hub portion 29 by suitable screw fasteners 51 and comprises a face plate 52 having a forwardly extending supporting or standard 53 in which is journalled an escapement release shaft 54 having a pair of side by side spaced notched portions providing escapement abutments 55 and 56 disposed in angular relation planes to each other as shown in FIGURES 3 and 5 in the respective paths of movement of the knife edge abutments 45 and 44 during movement thereof from position shown in FIGURE 5 (latched position) to the position in FIGURE 9 (release position).

The shaft 54 has mounted therein an inertia operated or eccentric weight member 57 which is connected to a time delay escapement 58.

The side face of the weight 57 carries a roller 59 arranged to lie with its axis in a plane through the axis of the central hub portion 29 and the axis of the shaft 43 forwardly of the shaft 43 as shown in FIGURES 5 and 8 when the inertia weight is disposed forwardly in the nose portion at one side of the axis of the hub portion. A weight member 60 is mounted on suitable guide means at opposite edges of the standard 53 with their adjacent faces (see FIGURE 3) disposed to engage the opposite sides of the roller 59 and prevent rotation of the inertia weight from the position shown, so long as the weight 60 is maintained in its "forward" position as shown in FIGURE 5. The weight is mounted on suitable guide rods 60$^a$ and coil spring 60$^b$ surrounding the guide rods, normally urging the weight member 60 to its forwardly extended positions. This disposes the flat surface of the notch 55 in the path of the abutment 45, as seen in FIGURE 5. As indicated the inertia weight is locked in its forward (off-center) position by the roller 59 retained between the adjacent sides of the inertia weight 60.

When the rocket is fired, its forward acceleration causes the weight 60 to move relatively rearwardly, due to its inertia, beyond the roller 59 and free the inertia weight 57. The forward acceleration of the rocket causes the eccentric inertia weight 57 to rotate the shaft under control of the clockwork escapement 58 and bring the second abutment 56 in front of the second knife edge 45, as the first abutment 55 is released and moves out of the way, permitting the lever plate 42 to fulcrum under the influence of the spring 47 until stopped by the abutment 55 on the shaft 54. The roller 59 has in the meantime moved to engage the forward (top) surface of the weight element 60 and the clock escapement has thus been stopped so to speak.

As the rocket approaches its maximum velocity the inertia of the weight 60 is no longer effective to hold the weight in its rearward position against the thrust of the springs 60$^b$ and the weight begins to move forwardly, also the relative rearward inertia of the eccentric weight 57 is reduced. The weight 60 in moving forward at this time in engagement with the roller 59 rotates the eccentric weight reversely until the roller passes off of the top (forward) end of the weight 60 and into the space between the adjacent edges of the weight allowing the weight 60 to move fully forward to lock the escapement shaft in its locking position. Since the time delay escapement mechanism is connected for operation with the weight 57 this will provide a predetermined time delay or retardation of the movement of the eccentric weight 57 while the rocket is in flight after it has acquired a predetermined or calculated speed which is calculated in terms of "range."

As the weight 57 is rotated toward its initial position the shaft 54 is rotated back to allow the abutment or "knife" edge 45 to escape past the abutment 54 and thus free the release plate 42. The spring 47 rocks the release plate 42, counter-clockwise causing its tail portion 41 to depress the tail portion 40 of the centrally pivoted latch 38. Rocking of the latch 38 disengages the catch or abutment 38$a$ thereon from the shoulder 23 on the arcuate lug 34 on the rotary locking plate 32. The spring 37 rotates the supporting or mounting plate 20 and nose section 5 (in a clockwise direction) relative to the rocket motor and chaff body and causes the locking lugs 24 to disengage the front flanges 7$^e$ on the chaff segments 7 and dispose the cut-away portions 23 around the flanges 7$^e$.

While the front flanges 7$^e$ engaged the locking lugs 24, the "radial" lugs 7$^f$ were retained in the radial slits or sockets 33 in the rotary locking plate 32 by the circular flanges 31 projecting rearwardly in their path, but rotation of the head or nose section by the spring 37 causes a rotary shifting of the circular retaining flanges 31 away from in front of the lugs 7$^f$. Since the chaff was compressed tightly in the chaff cartridges by the bands 12 and these were severed after closing and locking of the container segments 7 the expansion now causes radial outward movement of the front ends of the segments into the slip stream. Once the segments swing outwardly, even slightly the high velocity slip stream of air will whip them back and as the outwardly projecting flanges 7$^h$ leave the annular channel 14 and shoulder 15 they become separated from the rocket and mounting cap or support 6.

As before mentioned, when the rocket is fired a considerable rearward inertia is developed in the eccentric rotary weighted mass 57 and the longitudinally slidable weight members 60 during the acceleration of the rocket up to its maximum velocity, which first retracts the inertia weight 60, compressing the coil springs 60$^b$, retraction of the weight 60 freeing the rotary inertia operated weight or mass 57, which swings rearwardly retarding the time delay escapement and rotates the escapement release shaft 54 permitting the first knife edge abutment 44 to pass the shaft 54 and condition the chaff rocket for subsequent disintegration of the chaff section 1. When the rocket reaches or approaches its maximum or uniform velocity the rearward inertia of both weights 60 and 57 is reduced sufficiently to allow the springs "below" the weight 60 to move them forward, rotating the rotary eccentric weight or mass 57 forward under the control of the time delay escapement until the second notch 55 moves or tilts to free the second knife edge abutment 45 and permits the latch plate 42 to swing, rocking the latch member 38 to free the rotary locking plate 32, which rotates the whole nose section 5 and the chaff section disintegrates, freeing the chaff material. When carried by a fast modern aircraft the rocket is preferably carried and fired in the usual conventional manner, and in a forward direction, and further description in this connection is believed unnecessary. However it should be mentioned that, depending upon the rocket acceleration, the adjustment and construction of the timing mechanism 58, and the strength of the springs 60$^b$, the release of the chaff material will occur at a considerable predetermined range distance in front of the aircraft, for instance, about 2500 feet or more. This time or range distance can be changed.

In loading, the chaff cartridges or packages 9 are inserted in the chaff section 1 (before the front ends of the segments are brought together and latched in place) in an obvious manner. Then a cutting tool is manipulated (after closing the sections) in and along the slit between the adjacent edges (indicated at 8) to cut the narrow, rather thin, confining bands 12. This releases the enclosure bands or cylinders 10 and the expansion of these cylinders by the chaff is now prevented by the shell segments 7 being held in confining relation at their opposite ends. The chaff dispensing device is now ready for subsequent mounting on a rocket device or on the rocket racks or launchers and firing.

One safety feature of the chaff container assembly is that since no explosive or pyrotechnical fuse is used the device is inherently safe.

Another safety feature is that because of the use and arrangement of the inertia weights as shown and described, the device can be handled without special care since it is not possible to effect a release of chaff sections due to dropping or bumping. The device inherently requires a prolonged forward movement of considerable magnitude in order to accidentally cause the chaff container to open and spill its contents.

The invention has been described as operated in conjunction with a double abutment knife edge release shaft and a knife edge abutment lever having first and second knife edge abutments for engagement respectively with the first and second abutment surfaces in the notches in the shaft, it should be noted that the invention can be operated satisfactorily under certain conditions and while the rocket is still accelerating by only utilizing one notch and abutment surface in the shaft cooperating with the second knife edge abutment (and not using either the first notch or the first knife edge abutment on the latch plate). This requires a slight modification or adjustment of the shaft so that the base or bottom of the notch inclines, while the eccentric weight is locked at rest so that the inclined surface engages and prevents the second knife edge abutment from passing, thus holding the release plate 42 from releasing engagement with the release latch 40.

Figures 10, 14:
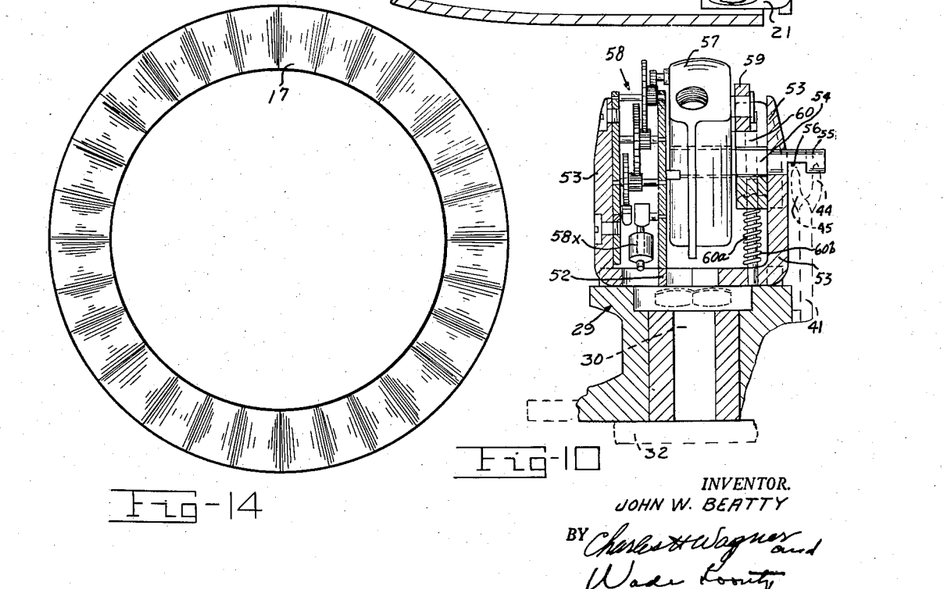
FIGURE 10 is a detailed view of the inertia control governor device which is used in combination with the mechanical fuse device of the subject invention.
FIGURE 14 is a detailed plan view of the spring washer employed at the rear end of the segmental chaff confining body.
Figure 11:
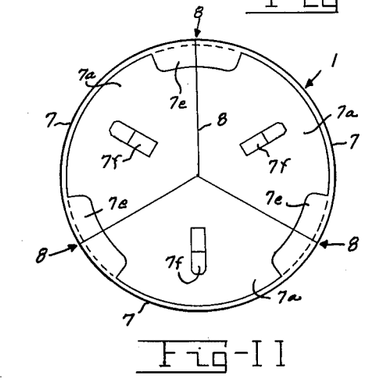
FIGURES 11 and 12 are respectively front and rear end views of the assembled segmental chaff confining body of the rocket.
Figure 12:
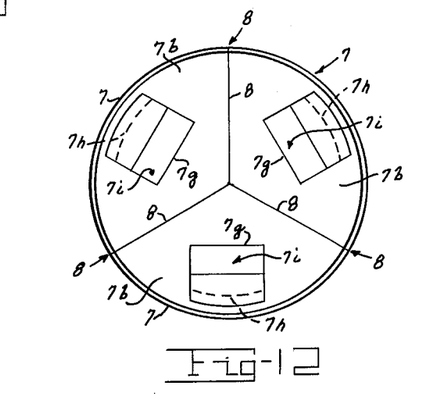
Figure 13:
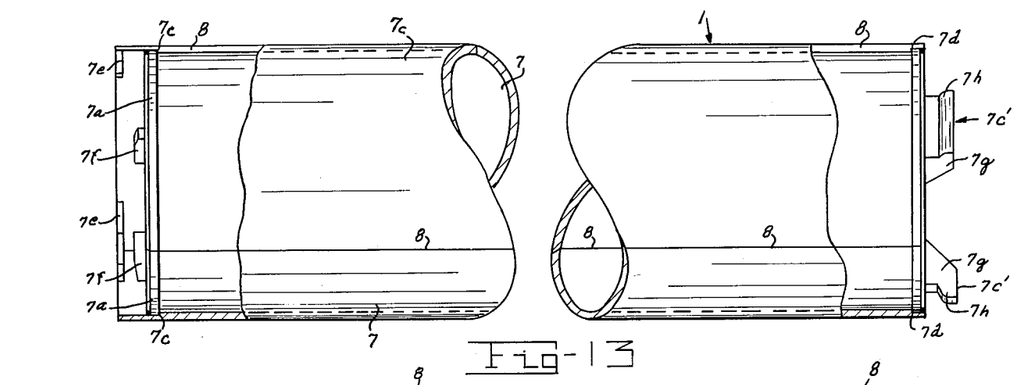
FIGURE 13 is a side view, foreshortened, of the chaff confining segmental body, parts being broken away and shown in section.

When the rocket is fired and is accelerating the locking weight 60 moves rearwardly and the eccentric weight 57 begins to turn or move rearwardly due to its rearward inertia relative to the rocket. The geared escapement 58 retards this rotation, however, it does turn slowly depending upon the weight of the pendulum 58X in the escapement as seen in FIGURE 10. (Moving the weight 58X outwardly (upwardly in FIGURE 10) increases the rate of oscillation of the weight 58X). The eccentric weight 57 rotates the shaft (even during maximum acceleration of the rocket) until the abutment surface 55 at the base of the notch in the end of the shaft 54 tilts sufficiently to release the latch lever or plate 42. The lever arm 41 thereof releases the latch 40 to release the release plate 32 which turns to release the front ends of the three segments 7, which spread and open to release the chaff material into the slip stream of the rocket.

While in this latter condition just mentioned the chaff is released much sooner, than when both abutments are employed. The escapement 58 will also control the opening of the chaff container satisfactorily, and at a material and predetermined distance ahead of the aircraft launching the rocket, depending, of course, upon the initial velocity of the aircraft at time of release, the acceleration of the rocket relative to the aircraft, the rate at which the escapement is set to operate, and to some extent the strengths of the springs 60$^b$ which yieldably urge the locking or inertia weight 57 in its forward position.

No invention is claimed in connection with any details of the escapement mechanism 58 except for the modification including the projecting end of shaft 54, also no specific claim is made to the detail manner of the interlocking relation between the petals 7 and the adapter ring 6, except for the corrugated spring 17.

While the invention has been illustrated and described in connection with one embodiment it is obvious that modifications and changes may be made by one skilled in the art without departing from the spirit of the invention as defined in the accompanying claims.

I claim:

1. In a chaff dispensing rocket, a high velocity rocket motor, a separable chaff dispensing receptacle axially mounted on the forward end of said high velocity rocket motor comprising separable segments extending forwardly from said rocket motor, means detachably connecting the rear ends of said separable segments to the forward end of the rocket motor, releasable means connecting said forward ends of said separable segments together, and rearwardly shiftable inertia weight operated means carried on the forward ends of said segments normally holding the forward ends of said segments together during firing and forward acceleration of said rocket motor to a predetermined velocity, and means operable by said inertia weight operated means for actuating said releasable means to release the forward ends of said separable segments for radial opening movement into the slip stream and spill chaff material, when contained in said chaff dispensing receptacle, into the slip stream after the chaff dispensing rocket has reached a predetermined velocity.

2. Apparatus as claimed in claim 1 including a predetermined time delay actuating escapement settable by said rearwardly shiftable inertia weight operated means, for retarding the release actuation of said release means following the acceleration of said rocket motor to said predetermined velocity.

3. A chaff dispensing attachment for high velocity rockets comprising, a rear support adapted to be fixed on the forward end of a high velocity rocket, a plurality of elongated complemental segmental shells releasably connected at their rear ends to said support for outward swinging movement of their forward ends forming an openable closed chaff receptacle adapted to contain quantities of chaff material therein dispensable into the slip stream of the high velocity rocket when said shells separate and swing outwardly at their forward ends, a separable nose section mounted on the forward ends of said shells for releasably holding said forward ends together, said nose section comprising a mounting plate having interlocking means for locking engagement with the forward ends of said shells and adjacent cutaway portions to receive said forward ends, whereby said forward ends are received through said cutaway portions and rotatable circumferentially into interlocking engagement with said interlocking means, a locking plate rotatably mounted on said mounting plate, interengaging actuating means between said forward ends and said locking plate for rotating said mounting plate and said nose section relative to said locking plate incident to relative rotation between said locking plate and said mounting plate, spring means operable between said locking plate and said mounting plate tensioned to rotate said mounting plate and shell to dispose said forward ends into disengaging positions in said cutaway portions, releasable latch means connected between said mounting plate and said locking plate, spring means normally holding said locking plate in locking position with said forward ends of said shell in interlocked engagement with said mounting plate, inertia controlled weight means carried by said mounting plate for relative rearward movement during the firing and forward acceleration of the rocket to a predetermined velocity, settable release means carried by said mounting plate for release actuation of said releasable latch means, spring means between said release means and said mounting plate for moving the release means to actuate said latch means to release position, spring means between said mounting plate and said inertia weight means normally urging said inertia weight means forwardly, and detent escapement means operable by said inertia weight means for retaining said release means in non-release position following rearward movement of said inertia weight means during acceleration of said rocket and releasing said release means following the subsequent forward movement of said inertia weight means by said spring means between the inertia weight means and the mounting plate upon predetermined reduction in acceleration, whereby the relative rearward inertia of the weight means during acceleration moves said weight means rearward to tension said last mentioned spring means and prevent release operation of said release means and said spring means, following a predetermined decrease in acceleration of said rocket with a corresponding decrease in said rearward inertia of said inertia operated weight means, advances said inertia weight means forwardly relative to said rocket to release said locking means for rotation of said nose section and mounting plate to release position, and means for separating said nose section from the forward ends of said shells to permit the shells to swing outwardly at their forward ends and disperse the container therein into the slip stream passing said rocket.

4. Apparatus as claimed in claim 3 including a time delay escapement operable by rearward movement of said inertia operated weight means for controlling the subsequent forward movement of said inertia operated weight means by the associated spring means, following a predetermined forward acceleration of said rocket.

5. Apparatus as claimed in claim 3 including inertia operated locking means mounted on said mounting plate for locking engagement with said weight means and movable rearwardly relative to the rocket during forward acceleration of said rocket to release said inertia operated weight means and movable to a locking position relative to the rocket to return and lock said inertia operated weight means against movement when the inertia operated weight means moves forward to or is in its locking position.

6. Apparatus as claimed in claim 3 wherein said inertia operated weight means comprises an eccentric weight or mass, an escapement shaft rotatably carried by said mounting plate having said eccentric mass fixed thereon with the axis of said shaft disposed transverse to the flight axis of the rocket and formed with side by side escapement detent notches therein forming inclined abutment surfaces disposed in acute angular relation to each other and tiltable by rotation of said shaft into the path of movement of said settable release means, said settable release means comprising a pivoted release plate having a first knife edge abutment disposed for abutment with said first inclined abutment surface when said eccentric mass is in its forward position relative to the rocket, forwardly and rearwardly shiftable inertia weight means carried by said mounting plate movable forwardly for moving said eccentric mass forwardly by impingement thereon, spring means between the shiftable weight means and said mounting plate for moving shiftable weight means and eccentric mass forwardly relative to the rocket, said shiftable weight means and said eccentric weight mass being movable rearwardly during acceleration to rotate said escapement shaft and tilt said first inclined abutment surface out of the path of said first knife edge, said release plate having a second knife edge abutment disposed in the path of said second inclined abutment surface, said second inclined abutment surface being tiltable incident to rotation of said shaft into the path of said second knife edge abutment by rearward movement of said eccentric mass relative to the rocket to prevent the movement of said release plate to release position, spring means between said release plate and said mounting plate for swinging said release plate to release position, an abutment arm on said release plate for impingement on said latch means to move said latch means to release position when the release plate is released by subsequent forward movement of said eccentric mass relative to the rocket and rotation of said shaft to tilt the second inclined surface for release of said second knife edge following a predetermined reduction in acceleration of said rocket.

7. An inertia controlled chaff dispensing rocket device comprising a rocket motor, an openable chaff container mounted on the forward end of said rocket motor adapted to contain chaff material therein, a nose section releasably mounted on the forward end of said chaff container, an inertia operated eccentric weight journalled in said nose section for rearward swinging movement relative to the rocket during forward acceleration of the rocket, a time delay escapement in said nose section settable by said eccentric weight during said relative rearward movement of said eccentric weight, inertia operated locking weight means in said nose section disposed in locking engagement with said eccentric weight and mounted for rearward movement relative to the rocket during forward acceleration of the rocket to release and disengage said eccentric weight, spring means in said nose section engaging said inertia operated locking weight means to yieldably urge said locking weight means forwardly toward its locking position, release means in said nose section for releasing said nose section from said chaff container, and actuating means operable between said eccentric weight means and said release means for moving said release means to a release position incident to forward movement of said eccentric weight means under control of said time delay escapement, relative to said rocket, following a predetermined reduction in acceleration of said rocket, said openable chaff container being split longitudinally to form longitudinal sections for outward swinging movement at their front ends upon release and removal of said nose section to dispense chaff material when contained in said container into the slip stream surrounding said rocket motor.

8. Apparatus as claimed in claim 7 including a plurality of self opening when released chaff cartridges disposed in said chaff container.

9. Apparatus as claimed in claim 8 in which the interior of chaff container is cylindrical and the container is composed of a plurality of elongated complemental segments having rear segmental ends, means on the front end of the rocket motor releasably interconnecting said rear segmental ends together for outward swinging movements at their forward ends, said segments having means at their forward ends for releasable interconnection to said nose section, and means for separating the nose section from said forward ends when the nose section is released, whereby said forward ends swing outwardly and rearwardly when released to dispense the chaff material in the container into the slip stream passing said rocket motor.

10. Apparatus as claimed in claim 9 in which said chaff material is compressed in cylindrical cartridges having a diameter and length to fit within the cylindrical interior of the segmental chaff container in longitudinally stacked relation.

11. Apparatus as claimed in claim 10 in which the chaff cartridges each comprise a longitudinally split cylindrical confining band having the chaff material compressed within the confines of the band.

12. Apparatus as claimed in claim 11 in which said longitudinally split confining bands have their ends disposed in overlapping relation, and a narrow thin confining band surrounds the exterior of the overlapping split cylindrical band substantially intermediate its longitudinal ends.

13. Apparatus as claimed in claim 12 in which the adjacent longitudinal edges of at least one adjacent pair of said segments forming said chaff container are spaced apart to provide a longitudinal slot accessible to the interior of the chaff container for the insertion of a cutting tool for the purpose of severing said narrow bands of the chaff cartridges after they have been stacked within the closed container.

(References on following page)

References Cited in the file of this patent

UNITED STATES PATENTS

| | | |
|---|---|---|
| 262,240 | Newby | Aug. 8, 1882 |
| 585,805 | Wilhelmi | July 6, 1897 |
| 1,013,195 | McConnaughy | Jan. 2, 1912 |
| 2,179,135 | Shever | Nov. 7, 1939 |
| 2,372,383 | Lee | Mar. 27, 1945 |
| 2,411,432 | Imber | Nov. 19, 1946 |
| 2,463,233 | Alexanderson | Mar. 1, 1949 |
| 2,476,302 | Jeppson | July 19, 1949 |
| 2,537,953 | Andrews | Jan. 16, 1951 |

FOREIGN PATENTS

| | | |
|---|---|---|
| 579,259 | Great Britain | July 29, 1946 |